(12) United States Patent
Ouchi et al.

(10) Patent No.: US 11,792,508 B2
(45) Date of Patent: Oct. 17, 2023

(54) REMOTE CONTROL DEVICE, IMAGING CONTROLLING DEVICE, AND METHODS FOR THEM

(71) Applicant: SONY GROUP CORPORATION, Tokyo (JP)

(72) Inventors: Tomoya Ouchi, Tokyo (JP); Toshiaki Ueda, Tokyo (JP); Takayuki Hatanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 59 days.

(21) Appl. No.: 17/593,072

(22) PCT Filed: Jan. 7, 2020

(86) PCT No.: PCT/JP2020/000144
§ 371 (c)(1),
(2) Date: Sep. 8, 2021

(87) PCT Pub. No.: WO2020/188957
PCT Pub. Date: Sep. 24, 2020

(65) Prior Publication Data
US 2022/0191383 A1 Jun. 16, 2022

(30) Foreign Application Priority Data
Mar. 20, 2019 (JP) ................. 2019-052451

(51) Int. Cl.
*H04N 23/66* (2023.01)
*G01P 13/00* (2006.01)
(Continued)

(52) U.S. Cl.
CPC ............. *H04N 23/66* (2023.01); *G01P 13/00* (2013.01); *H04N 7/185* (2013.01); *H04N 23/67* (2023.01); *H04N 23/695* (2023.01)

(58) Field of Classification Search
CPC ........ H04Q 9/00; H04N 23/695; H04N 23/66; H04N 7/185; H04N 23/67; G03B 17/00;
(Continued)

(56) References Cited

U.S. PATENT DOCUMENTS 5,491,510 A * 2/1996 Gove ...................... H04N 5/64
348/45
5,905,525 A * 5/1999 Ishibashi .............. H04N 13/117
348/E13.052
(Continued)

FOREIGN PATENT DOCUMENTS

JP 2000-083246 A 3/2000
JP 2000-333161 A 11/2000
(Continued)

OTHER PUBLICATIONS

International Search Report and Written Opinion of PCT Application No. PCT/JP2020/000144, dated Mar. 17, 2020, 09 pages of ISRWO.

*Primary Examiner* — Pritham D Prabhakher
(74) *Attorney, Agent, or Firm* — CHIP LAW GROUP

(57) ABSTRACT

A remote control device 60 measures a distance to a noticed imaging target OB directly in front of the remote control device 60 by a distance measurement unit. Further, the remote control device 60 measures a movement from an initial state by a motion sensor unit and transmits imaging target position information indicative of the measured distance and movement from a communication unit to an imaging device 20. An imaging target position calculation unit provided on the imaging device 20 calculates, on the basis of the imaging target position information from the remote control device 60, a direction of the noticed imaging target OB with respect to the direction in the initial state of the imaging device 20. By generating a direction controlling signal on the basis of a calculation result of the imaging (Continued)

target position calculation unit and outputting the direction controlling signal to a pan head 40, the imaging direction of the imaging device 20 can be set to the direction of the noticed imaging target OB.

12 Claims, 9 Drawing Sheets

(51) Int. Cl.
*H04N 7/18* (2006.01)
*H04N 23/67* (2023.01)
*H04N 23/695* (2023.01)

(58) Field of Classification Search
CPC ........ G03B 17/56; G03B 17/18; G03B 15/00; G01P 13/00
USPC ....................................... 348/211.9
See application file for complete search history.

(56) References Cited

U.S. PATENT DOCUMENTS

| | | | | |
|---|---|---|---|---|
| 6,215,461 | B1* | 4/2001 | Ishibashi | H04N 13/344 348/39 |
| 9,158,305 | B2* | 10/2015 | Ohtomo | G05D 1/0038 |
| 10,306,217 | B2* | 5/2019 | Sato | H04N 13/398 |
| 10,377,487 | B2* | 8/2019 | Takahashi | H04N 23/63 |
| 10,574,897 | B2* | 2/2020 | Ozawa | G02B 27/0172 |
| 10,809,716 | B2* | 10/2020 | Zhong | H04N 23/66 |
| 2012/0032795 | A1* | 2/2012 | Ishii | H04N 23/64 340/539.1 |
| 2013/0038692 | A1* | 2/2013 | Ohtomo | G05D 1/0016 348/46 |
| 2013/0173088 | A1* | 7/2013 | Callou | B64C 39/024 701/2 |
| 2013/0229528 | A1* | 9/2013 | Taylor | G01S 3/785 348/169 |
| 2014/0225812 | A1* | 8/2014 | Hosoya | G02B 27/0093 345/8 |
| 2014/0267744 | A1* | 9/2014 | Taylor | G01S 1/00 348/157 |
| 2015/0319365 | A1* | 11/2015 | Lloyd | H04N 23/687 348/208.11 |
| 2016/0309143 | A1* | 10/2016 | Fu | H04N 23/56 |
| 2016/0313973 | A1* | 10/2016 | Yajima | G06F 3/165 |
| 2016/0349849 | A1* | 12/2016 | Kwon | B64D 47/08 |
| 2017/0330346 | A1* | 11/2017 | Oshima | H04N 23/632 |
| 2018/0217590 | A1* | 8/2018 | Kobayashi | G05D 1/0038 |
| 2018/0249085 | A1* | 8/2018 | Ozawa | H04N 13/296 |
| 2020/0137295 | A1* | 4/2020 | Zhong | H04N 23/67 |

FOREIGN PATENT DOCUMENTS

| | | |
|---|---|---|
| JP | 2006-108730 A | 4/2006 |
| JP | 2007-068066 A | 3/2007 |
| WO | 2006/028247 A1 | 3/2006 |

* cited by examiner

REMOTE CONTROL DEVICE, IMAGING CONTROLLING DEVICE, AND METHODS FOR THEM

CROSS REFERENCE TO RELATED APPLICATIONS

This application is a U.S. National Phase of International Patent Application No. PCT/JP2020/000144 filed on Jan. 7, 2020, which claims priority benefit of Japanese Patent Application No. JP 2019-052451 filed in the Japan Patent Office on Mar. 20, 2019. Each of the above-referenced applications is hereby incorporated herein by reference in its entirety.

TECHNICAL FIELD

The present technology relates to a remote control device, an imaging controlling device, and methods for them and makes it possible to easily capture an image of an imaging target of which an image-capturing person takes notice.

BACKGROUND ART

In the related art, in an imaging system, an imaging direction of an imaging device is controlled by a remote control device. For example, in PTL 1, a system is configured using an imaging device, a remote pan head, an operation device for controlling the remote pan head, and a portable terminal that wirelessly communicates with the operation device such that a captured image of the imaging device can be confirmed on the portable terminal. Further, it is made possible to switch a primary controller for the remote pan head from the operation device to the portable terminal such that the remote pan head can be operated from the portable terminal to capture an image of a desired position with the imaging device.

CITATION LIST

Patent Literature

[PTL 1]
Japanese Patent Laid-Open No. 2007-068066

SUMMARY

Technical Problem

Incidentally, in a case where an image-capturing person operates the portable terminal to control the remote pan head, the image-capturing person cannot grasp a change of a scene while operating the portable terminal. Accordingly, there is a possibility that the image-capturing person may miss a desirable scene. Further, since it is necessary for the image-capturing person to perform an operation of the portable terminal, the image-capturing person cannot concentrate, for example, on watching sports or the like.

Therefore, it is an object of the present technology to provide a remote control device, an imaging controlling device, and methods for them and makes it possible to easily capture an image of an imaging target of which an image-capturing person takes notice.

Solution to Problem

A first aspect of the present technology resides in a remote control device including a distance measurement unit that measures a distance to an imaging target, a motion sensor unit that measures a movement from an initial state, and a communication unit that transmits imaging target position information indicative of the distance measured by the distance measurement unit and the movement measured by the motion sensor unit to a control target device.

In this technology, a state in which the distance measurement unit that measures a distance to an imaging target and the imaging unit of the control target device are opposed to each other is determined as the initial state, and calibration is performed. The distance to the imaging unit measured by the distance measurement unit and a direction of the imaging unit are used as references. Further, a display unit that displays a captured image generated by the imaging unit of the control target device and the distance measurement unit are held by a hold unit such that the display unit is at a position of the eyes of a user and the distance measurement unit is at a position from which the distance measurement unit measures a distance to the imaging target that is positioned directly in front of the user. The motion sensor unit measures the movement from the initial state. The communication unit transmits imaging target position information indicative of the distance measured by the distance measurement unit and the movement measured by the motion sensor unit to the control target device. Alternatively, the communication unit outputs the captured image generated by the imaging unit of the control target device to the display unit.

A second aspect of the present technology resides in a remote control method including measuring, by a distance measurement unit, a distance to an imaging target, measuring, by a motion sensor unit, a movement from an initial state, and transmitting, from a communication unit, imaging target position information indicative of the distance measured by the distance measurement unit and the movement measured by the motion sensor unit to a control target device.

A third aspect of the present technology resides in an imaging controlling device including an imaging target position calculation unit that calculates, on the basis of imaging target position information indicative of a distance from a remote control device to an imaging target and a movement of the remote control device from an initial state, a direction of the imaging target with respect to a direction in the initial state of an imaging unit of a control target device.

In this technology, a state in which the distance measurement unit of the remote control device and the imaging unit of the control target device are opposed to each other is determined as the initial state, and calibration is performed. The direction of the distance measurement unit is used as a reference for the control target device. The imaging target position calculation unit calculates, on the basis of imaging target position information indicative of a distance from the remote control device to the imaging target and a movement of the remote control device from the initial state, a direction of the imaging target with respect to the direction in the initial state of the imaging unit of the control target device. Further, the imaging target position calculation unit calculates the distance from the imaging unit of the control target device to the imaging target. The imaging target position calculation unit is provided on the remote control device or the control target device.

The imaging controlling device may further include an imaging direction controlling unit that generates a direction controlling signal for setting the imaging direction of the imaging unit of the control target device to the direction of the imaging target calculated by the imaging target position calculation unit, or may further include a focus controlling unit that generates a focus controlling signal for setting a focus position of the imaging unit of the control target device to a position of the distance to the imaging target calculated by the imaging target position calculation unit. The imaging direction controlling unit or the focus controlling unit may be provided on the remote control device or the control target device.

A fourth aspect of the present technology resides in an imaging controlling method including calculating, by an imaging target position calculation unit, on the basis of imaging target position information indicative of a distance from a remote control device to an imaging target and a movement of the remote control device from an initial state, a direction of the imaging target with respect to the initial state of an imaging unit of a control target device.

DESCRIPTION OF EMBODIMENTS

In the following, modes for carrying out the present technology are described. It is to be noted that the description is given in the following order.

1. Imaging System
2. Embodiments
2-1. First Embodiment
2-1-1. Configuration of First Embodiment
2-1-2. Action of First Embodiment
2-1-3. Example of Action of First Embodiment
2-1-4. Another Example of Action of First Embodiment
2-2. Second Embodiment
2-3. Other Embodiments
3. Application Example

1. IMAGING SYSTEM

Figure 1:
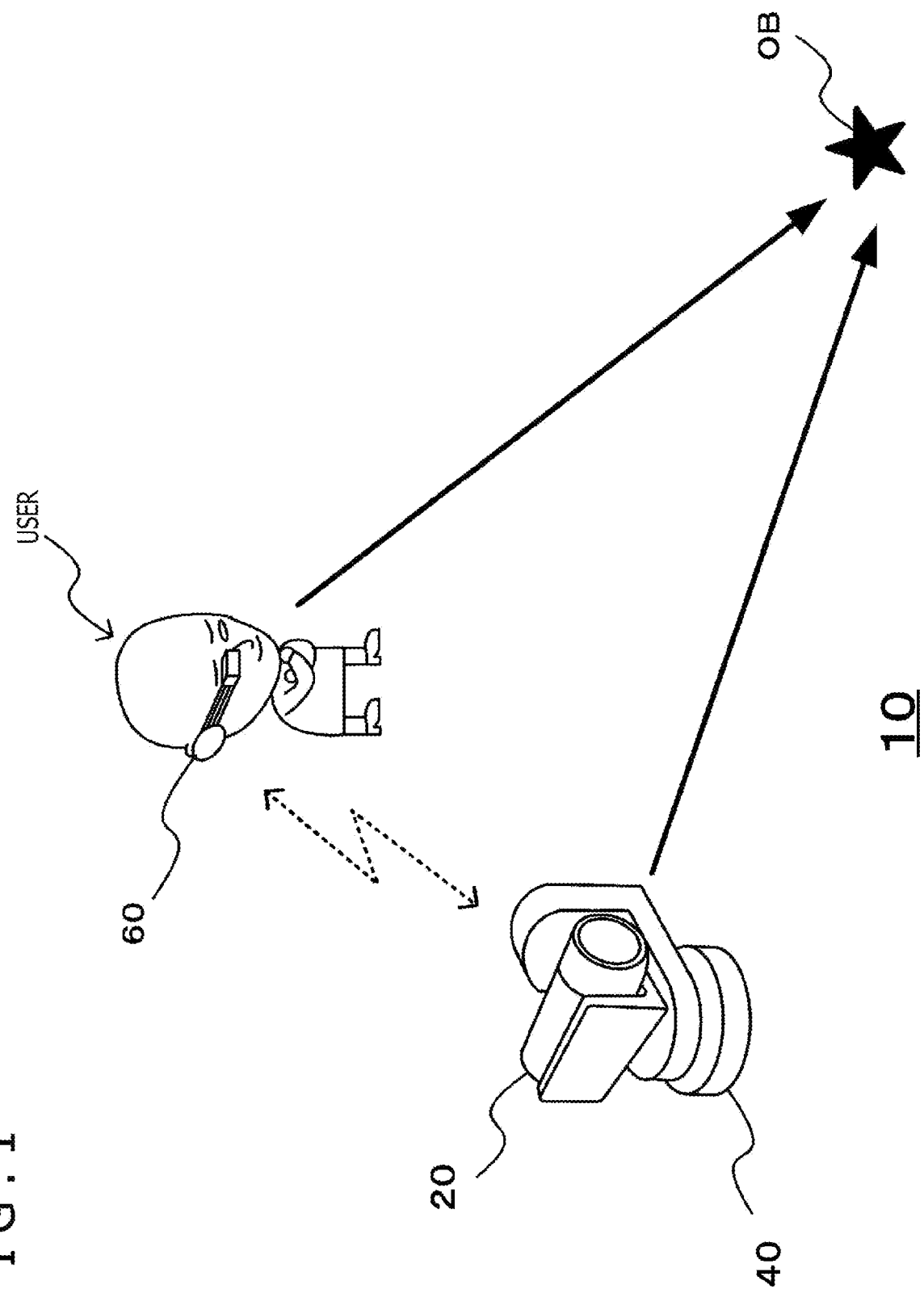
FIG. 1 is a view depicting a configuration of an imaging system.

FIG. 1 depicts a configuration of an imaging system that uses a remote control device and an imaging device of the present technology.

An imaging system 10 includes an imaging device 20, a pan head 40, and a remote control device 60. The imaging device 20 is fixed to the pan head 40 such that an imaging direction thereof can be changed in the pan direction and the tilt direction through the pan head 40. Further, the imaging device 20 and the remote control device 60 are configured so as to be able to communicate with each other by a wireless or wired transmission line. The remote control device 60 is configured such that it can be mounted, for example, on the head of a user (image-capturing person). It is to be noted that the remote control device 60 may be configured such that it can be held by a hand of a user.

The remote control device 60 performs remote control of the imaging device 20, which is a control target device, or the imaging device 20 and the pan head 40 such that an imaging target of which the user takes notice as an imaging object from a remote position (such imaging target is hereinafter also referred to as a "noticed imaging target") can be imaged by the imaging device 20. The remote control device 60 generates imaging target position information including movement information indicative of a distance to a noticed imaging target OB and the direction of the noticed imaging target OB. Further, the imaging device 20 or the remote control device 60 generates a direction controlling signal for setting the imaging direction of the imaging device 20 to the direction of the noticed imaging target on the basis of a relative positional relation between the imaging device 20 and the remote control device 60 and the imaging target position information generated by the remote control device 60. The imaging device 20 or the remote control device 60 outputs the generated direction controlling signal to the pan head 40. The pan head 40 moves the imaging device 20 on the basis of the direction controlling signal such that the noticed imaging target OB can be imaged by the imaging device 20.

2. EMBODIMENTS

Next, embodiments are described. It is to be noted that the embodiments exemplify a case in which the remote control device 60 is configured such that it can be mounted on the head of a user.

Figure 2B:
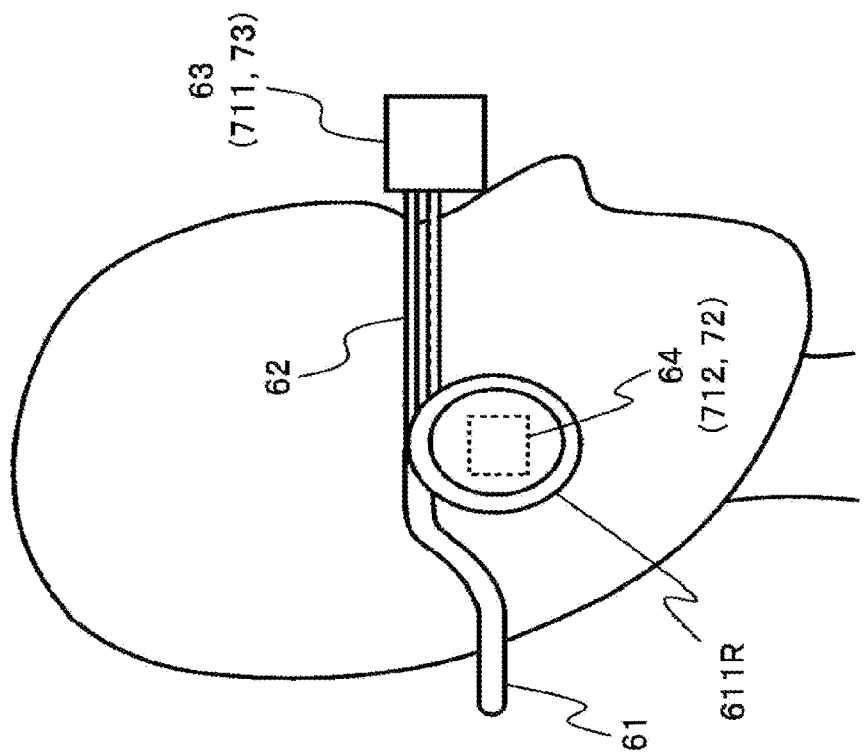
FIGS. 2A and 2B depict views exemplifying a remote control device.
Figure 2A:
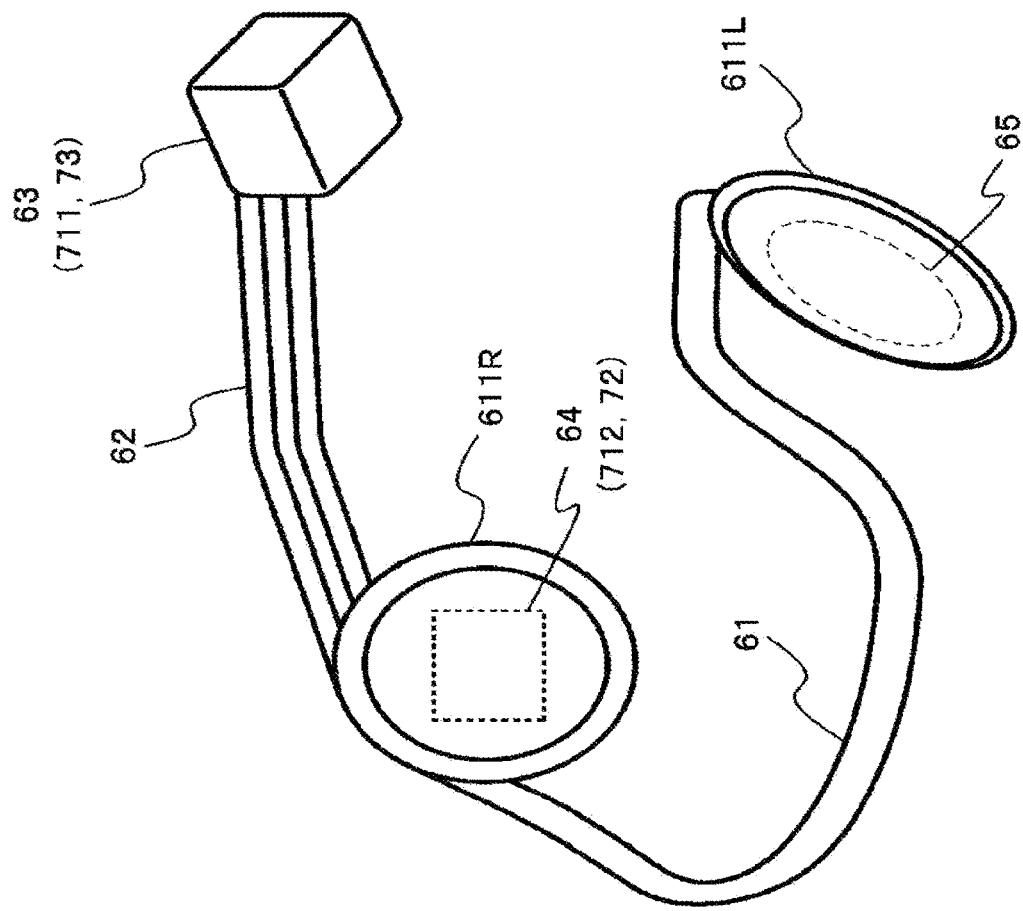

FIGS. 2A and 2B exemplify the remote control device. It is to be noted that FIG. 2A depicts an appearance of the remote control device, and FIG. 2B depicts a used state of the remote control device. The remote control device 60 includes a hold unit 61, an arm unit 62, an ocular block 63, a circuit block 64, and a power supply unit 65.

The hold unit 61 holds the remote control device 60 such that, when the remote control device 60 is mounted on the head of a user, the remote control device 60 does not get out of the head. The hold unit 61 includes a neck band 610 having, for example, a U shape as viewed from above, and ear pads 611L and 611R provided at the distal ends of the neck band 610. The hold unit 61 is held at a predetermined position with respect to the head of the user such that the head is sandwiched by the ear pads 611L and 611R or the ear pads 611L and 611R are locked to the ears in a state in which a curved portion of the hold unit 61 contacts with the back of the head (or with the neck) of the user.

The arm unit 62 that extends forwardly is provided at one end of the hold unit 61, and the ocular block 63 is provided at a distal end of the arm unit 62.

The ocular block 63 includes a display unit 73 and performs an action as an electronic viewfinder. Further, the ocular block 63 includes a distance measurement unit 711 and measures a distance to a noticed imaging target, which is given by an imaging target positioned directly in front of the user who wears the remote control device 60.

The circuit block 64 is provided on the ear pad 611R and includes a motion sensor unit 712 and a communication unit 72. The power supply unit 65 is provided at the other ear pad 611L. The motion sensor unit 712 is configured using, for example, a nine-axis sensor that detects three-axis accelerations, three-axis angular velocities, and three-axis geomagnetisms (directions). The motion sensor unit 712 generates movement information indicative of amounts of change and so forth of a position change and a posture change of the remote control device 60.

The communication unit 72 transmits imaging target position information including the distance to the noticed imaging target OB measured by the distance measurement unit 711 and the movement information generated by the motion sensor unit 712 to the imaging device 20. Further, the communication unit 72 receives an image signal transmitted from the imaging device 20 and outputs the image signal to the display unit 73 of the ocular block 63. The power supply unit 65 supplies power to the communication unit 72, the display unit 73, the distance measurement unit 711, and the motion sensor unit 712. It is to be noted that the arrangement of the power supply unit 65, the motion sensor unit 712, and the communication unit 72 depicted in FIG. 2A are exemplary, and they may be provided at other positions.

As depicted in FIG. 2B, the remote control device 60 worn by the user is held by the hold unit 61 such that the display unit 73 is at a position of the eyes of the user and the distance measurement unit 711 is at a position from which the distance measurement unit 711 measures the distance to an imaging target positioned directly in front of the user.

2-1. First Embodiment 2-1-1. Configuration of First Embodiment

Next, a first embodiment is described. In the first embodiment, a position of the imaging device 20 is fixed, and the imaging direction of the imaging device 20 is movable in a pan direction and a tilt direction through the pan head 40. Further, a position of the remote control device 60 may be fixed or may be movable.

Figure 3:
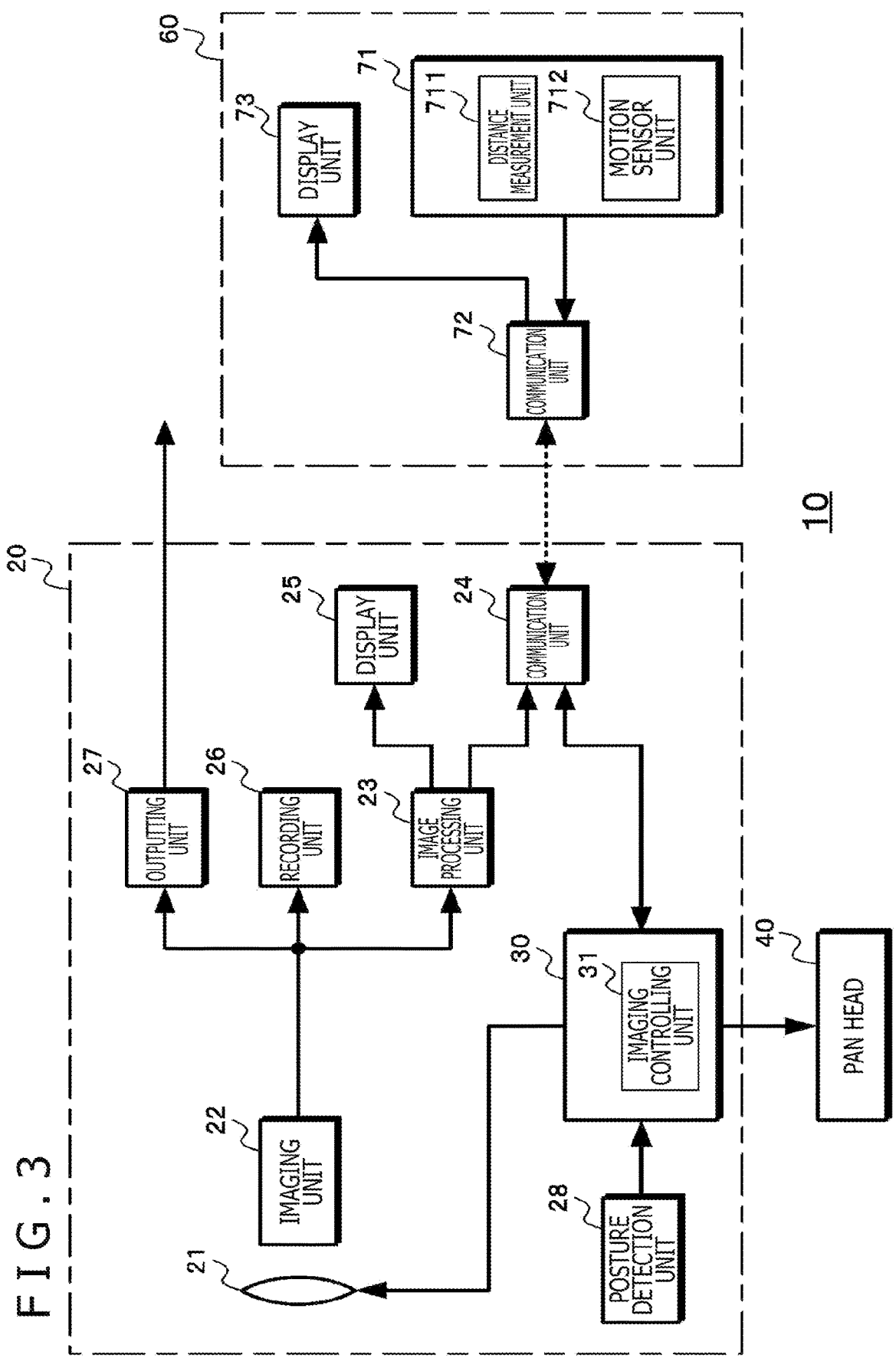
FIG. 3 is a view exemplifying a configuration of a first embodiment.

FIG. 3 exemplifies a configuration of the first embodiment. The imaging device 20 includes an imaging optical system block 21, an imaging unit 22, an image processing unit 23, a communication unit 24, a posture detection unit 28, and a control unit 30. Further, the imaging device 20 may include a display unit 25, a recording unit 26, and an outputting unit 27.

The imaging optical system block 21 is configured using a focusing lens and forms an imaging target optical image on an imaging plane of the imaging unit 22. Further, the imaging optical system block 21 may include a zoom lens, an iris mechanism, and so forth.

The imaging unit 22 includes an imaging element, such as a CMOS (Complementary Metal Oxide Semiconductor) or a CCD (Charge Coupled Device), and a signal processing unit. The imaging element performs photoelectric conversion to generate an image signal according to an imaging target optical image. The signal processing unit performs a denoising process, a gain adjustment process, an analog/digital conversion process, defective pixel correction, a development process, and so forth on a pixel signal generated by the imaging element. The imaging unit outputs the generated image signal to the image processing unit 23. Further, the imaging unit 22 outputs the generated image signal to the recording unit 26 and the outputting unit 27.

The image processing unit 23 converts an image signal supplied from the imaging unit 22 into an image signal according to a display resolution of the display unit 73 of the remote control device 60 and outputs the image signal after the conversion to the communication unit 24. Further, the image processing unit 23 converts an image signal supplied from the imaging unit 22 into an image signal according to the display resolution of the display unit 25 and outputs the image signal to the display unit 25.

The posture detection unit 28 detects a posture of the imaging device 20 and outputs a posture detection result to the control unit 30.

The communication unit 24 performs communication with the remote control device 60 and transmits an image signal supplied from the image processing unit 23 to the remote control device 60. Further, the communication unit 24 receives and outputs imaging target position information transmitted from the remote control device 60 to the control unit 30.

The display unit 25 is configured using a liquid crystal display element, an organic EL display element, or the like. The display unit 25 displays a captured image generated by the imaging device 20, on the basis of an image signal supplied from the image processing unit 23. Further, the display unit 25 performs menu display or the like of the imaging device 20 on the basis of a control signal from the control unit 30.

The recording unit 26 is configured using a recording medium fixed to the imaging device 20 or a recording medium removable from the imaging device 20. The recording unit 26 records an image signal generated by the imaging unit 22 into the recording medium on the basis of a control signal from the control unit 30. Further, the outputting unit 27 outputs an image signal generated by the imaging unit 22 to an external device on the basis of a control signal from the control unit 30.

The control unit 30 includes a CPU (Central Processing Unit), a ROM (Read Only Memory), a RAM (Random Access Memory), and so forth. The ROM has stored therein various programs that are executed by the CPU. The RAM stores information such as various parameters therein. The CPU executes the various programs stored in the ROM to control each unit such that an action according to a user operation is performed by the imaging device 20. Further, the control unit 30 includes an imaging controlling unit 31 that controls the imaging device 20 to capture an image of the noticed imaging target OB, on the basis of imaging target position information supplied from the remote control device 60.

Figure 4:
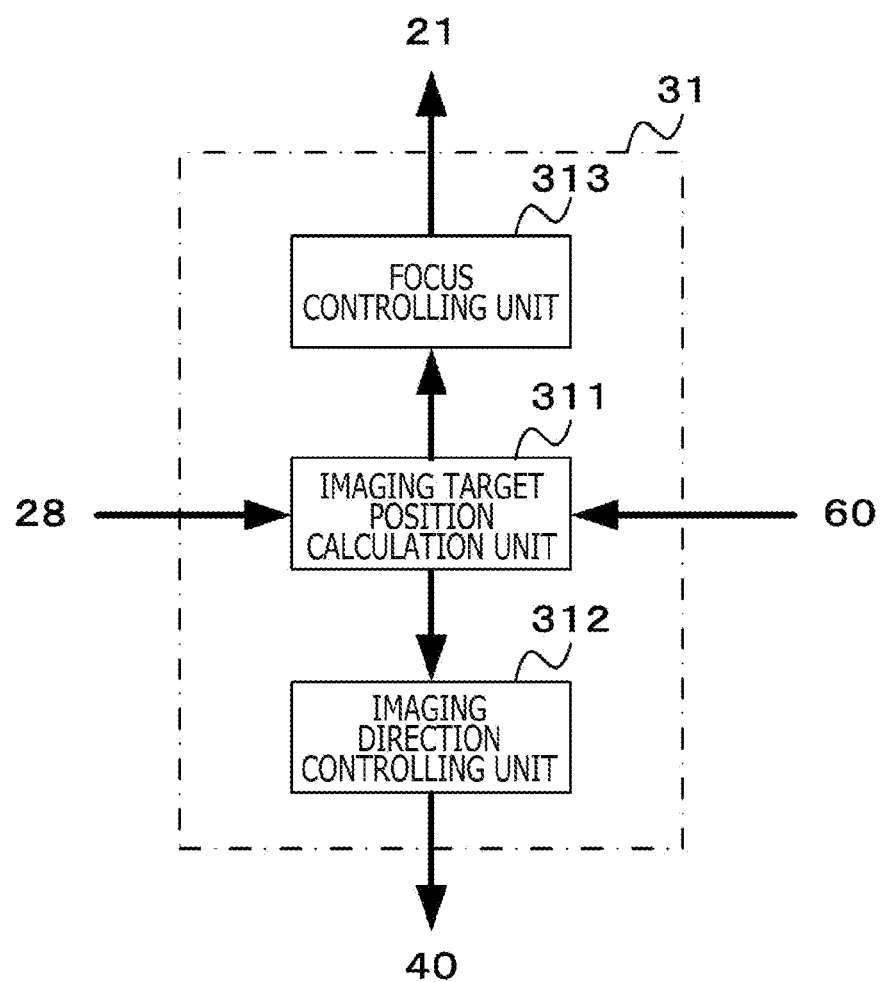
FIG. 4 is a view exemplifying a functional configuration of an imaging controlling unit.

FIG. 4 exemplifies a functional configuration of the imaging controlling unit. The imaging controlling unit 31 includes an imaging target position calculation unit 311, an imaging direction controlling unit 312, and a focus controlling unit 313. It is to be noted that, in a case where the depth of field of the imaging device 20 is so great that focus adjustment is not required, the imaging controlling unit 31 may not include the focus controlling unit 313.

The imaging target position calculation unit 311 calculates the direction of a noticed imaging target or the direction and the distance to the noticed imaging target, on the basis of a posture detection result of the posture detection unit 28 and imaging target position information supplied from the remote control device 60. It is to be noted that details of calculation of the direction of the noticed imaging target and the distance to the noticed imaging target are hereinafter described. The imaging target position calculation unit 311 outputs a calculation result of the direction of the noticed imaging target to the imaging direction controlling unit 312 and outputs a calculation result of the distance to the noticed imaging target to the focus controlling unit 313.

The imaging direction controlling unit 312 generates, on the basis of the calculation result of the direction of the noticed imaging target, a direction controlling signal such that the imaging direction of the imaging device 20 becomes the direction of the noticed imaging target, and outputs the direction controlling signal to the pan head 40. Further, the focus controlling unit 313 generates, on the basis of a calculation result of the distance to the noticed imaging target, a focus controlling signal such that a focus position of the imaging device 20 becomes the noticed imaging target, and outputs the focus controlling signal to the imaging optical system block 21.

Referring back to FIG. 3, the remote control device 60 is described. The remote control device 60 includes an imaging target position information generation unit 71, the communication unit 72, and the display unit 73. Further, the imaging target position information generation unit 71 includes the distance measurement unit 711 and the motion sensor unit 712.

As described hereinabove, the distance measurement unit 711 measures the distance to the noticed imaging target positioned directly in front of the user who wears the remote control device 60. The motion sensor unit 712 generates movement information indicative of amounts of change and so forth of the position change and the posture change of the remote control device 60. The imaging target position information generation unit 71 generates imaging target position information indicative of the distance to the noticed imaging target measured by the distance measurement unit 711 and the movement information generated by the motion sensor unit 712 and outputs the imaging target position information to the communication unit 72.

The communication unit 72 transmits the imaging target position information generated by the imaging target position information generation unit 71 to the imaging device 20. Further, the communication unit 72 receives an image signal transmitted from the imaging device 20 and outputs the image signal to the display unit 73.

The display unit 73 is configured using a liquid crystal display element, an organic EL display element, or the like. The display unit 73 displays a captured image generated by the imaging device 20, on the basis of an image signal received by the communication unit 72.

2-1-2. Action of First Embodiment

Figure 5:
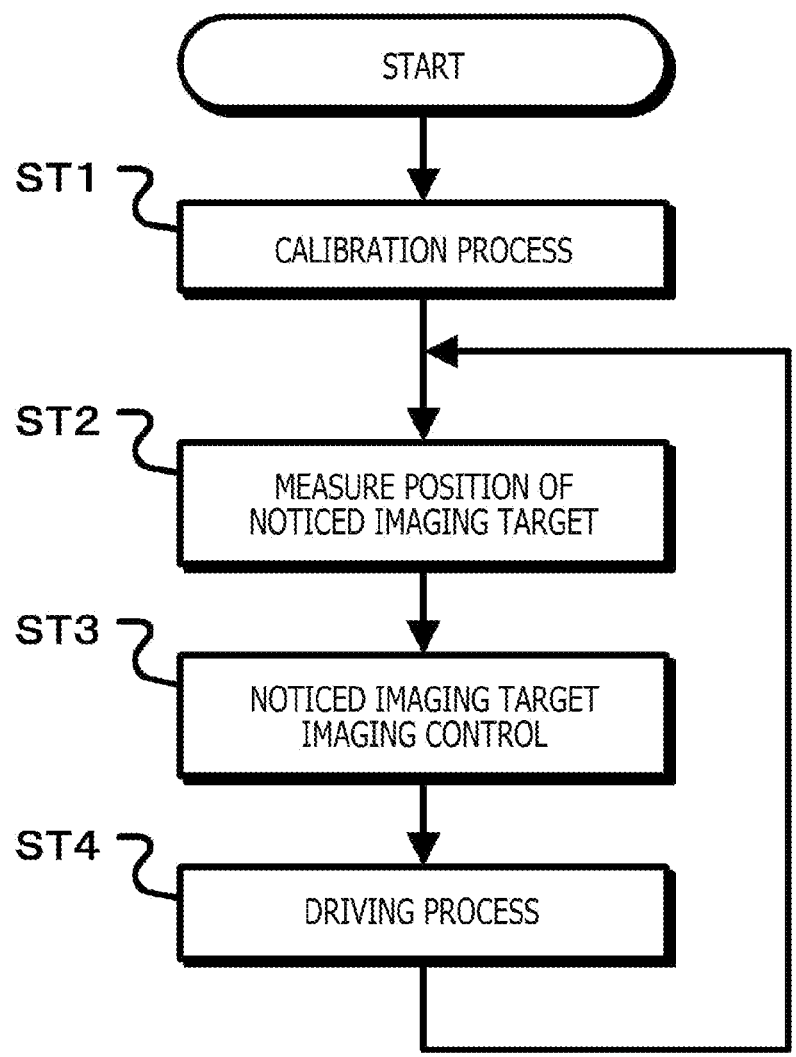
FIG. 5 is a flow chart exemplifying an action of the imaging system.

FIG. 5 is a flow chart exemplifying an action of the imaging system. In step ST1, the imaging system 10 performs a calibration process. The imaging system 10 calculates, in an initial state determined as a state in which the imaging device 20 and the remote control device 60 are opposed to each other, the distance to the imaging device 20, by the remote control device 60, for example, and determines the distance as a reference distance. Further, the imaging device 20 sets the direction of the remote control device 60 as a reference direction, and the remote control device 60 sets the direction of the imaging device 20 as the reference direction. Then, the processing advances to step ST2.

In step ST2, the remote control device measures a position of the noticed imaging target. The user changes his/her posture such that the noticed imaging target is directly in front of the user after the calibration process, and the remote control device 60 measures, by the distance measurement unit 711, the distance to the noticed imaging target positioned directly in front of the remote control device 60 and generates movement information indicative of a posture change amount (angle) to the direction of the noticed imaging target with reference to the reference direction by the motion sensor unit 712. Further, in a case where the user moves, the motion sensor unit 712 of the remote control device 60 generates movement information indicative of the distance and the direction of the movement. The remote control device transmits imaging target position information including the measured distance and the movement information to the imaging device 20, and the processing advances to step ST3.

In step ST3, the imaging controlling unit of the imaging device performs noticed imaging target imaging control. The imaging controlling unit 31 calculates the noticed imaging target direction and the distance to the noticed imaging target from the imaging device 20 on the basis of the imaging target position information supplied from the remote control device 60. Further, the imaging controlling unit 31 generates a direction controlling signal on the basis of the noticed imaging target direction and generates a focus controlling signal on the basis of the distance to the noticed imaging target, and then the processing advances to step ST4.

In step ST4, the remote pan head and the imaging device perform a driving process. The pan head 40 moves the imaging direction of the imaging device 20 to the noticed imaging target direction on the basis of the direction controlling signal generated in step ST3. Further, the imaging device 20 drives the imaging optical system block 21 on the basis of the focus controlling signal generated in step ST3 to perform focus adjustment such that the focus position becomes the position of the noticed imaging target, and thereafter, the processing returns to step ST2. It is to be noted that, in a case where the depth of field of the imaging device 20 is great, the focus adjustment may not be performed.

2-1-3. Example of Action of First Embodiment

Figure 6:
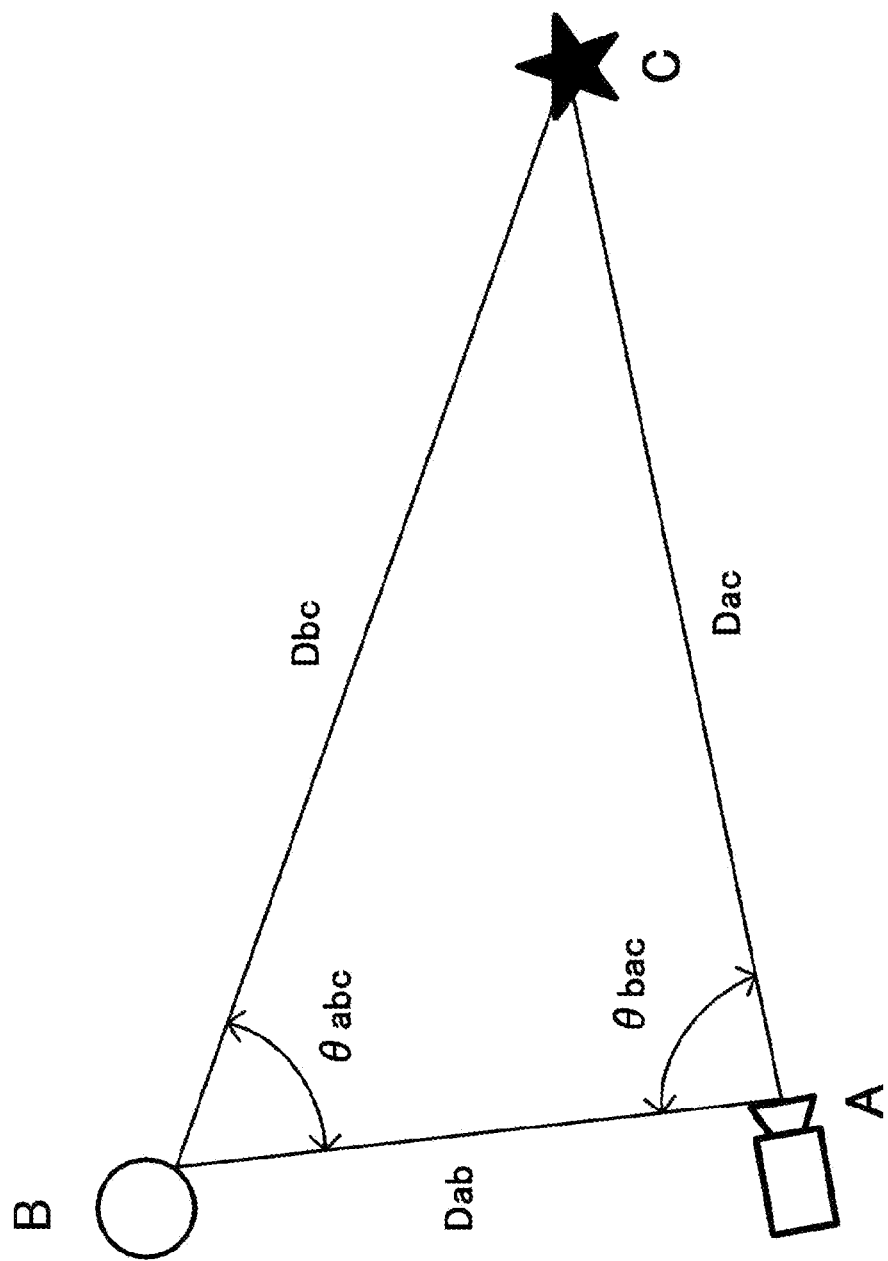
FIG. 6 is a view illustrating an action of an imaging target position calculation unit.

Next, an example of an action of the first embodiment is described. FIG. 6 is a view illustrating an action of the imaging target position calculation unit of the imaging controlling unit. It is to be noted that, in FIG. 6, a position of the imaging device 20 attached to the pan head 40 is indicated by "A," a position of the remote control device 60 is indicated by "B," and a position of the noticed imaging target is indicated by "C."

In the imaging system 10, the imaging device 20 and the remote control device 60 are opposed to each other, and calibration is performed. The postures of the imaging device 20 and the remote control device 60 at this time are each determined as an initial state. Further, the remote control device 60 measures a distance Dab to the imaging device 20 in the initial state and transmits the distance Dab to the imaging device 20.

Thereafter, the user wearing the remote control device 60 turns to the direction of the noticed imaging target from the imaging device 20, and the distance measurement unit 711 of the remote control device 60 measures a distance Dbc from a position B to a position C. Further, the motion sensor unit 712 measures an angle θabc of the direction of the position C with respect to the reference direction (direction of a position A). The remote control device transmits, to the imaging device 20, the distance Dbc and the angle θabc as imaging target position information.

The imaging target position calculation unit 311 of the imaging device 20 calculates a distance Dac from the position A of the imaging device to the position C of the imaging target, on the basis of an expression (1).

[Math. 1]

$$D_{ac} = \sqrt{D_{ab}^2 + D_{bc}^2 - 2*D_{ab}*D_{bc}*\cos\theta abc} \quad (1)$$

Further, the imaging target position calculation unit 311 calculates an angle θbac of the direction of the position C with respect to the reference direction (direction of the position B) of the imaging device 20, on the basis of an expression (2).

[Math. 2]

$$\cos\theta_{bac} = \frac{D_{ab}^2 + D_{ac}^2 - D_{bc}^2}{2*D_{ab}*D_{ac}} \quad (2)$$

The imaging target position calculation unit 311 outputs the calculated angle θbac to the imaging direction controlling unit 312, and the imaging direction controlling unit 312 generates a direction controlling signal for setting the imaging direction of the imaging device 20 to the direction of the angle θbac with respect to the reference direction (direction of the position B) and outputs the direction controlling signal to the pan head 40. Accordingly, the imaging direction of the imaging device 20 can be made the direction of the noticed imaging target.

The imaging target position calculation unit 311 outputs the calculated distance Dac to the focus controlling unit 313, and the focus controlling unit 313 generates a focus controlling signal for setting the focus position of the imaging device 20 to the distance Dac and outputs the focus controlling signal to the imaging optical system block 21. Accordingly, the focus of the imaging device 20 can be adjusted to the noticed imaging target.

Further, if the user changes his/her posture so as to track the noticed imaging target, then the remote control device 60 generates new imaging target position information indicative of the distance to the noticed imaging target and movement information for tracking the noticed imaging target and transmits the imaging target position information to the imaging device 20. Accordingly, by performing imaging direction control and focusing control on the basis of the new imaging target position information, the imaging device 20 can cause the imaging direction and the focus position to track the noticed imaging target so as to be able to successively acquire captured images that are focused on the noticed imaging target.

Furthermore, since the captured image acquired by the imaging device 20 is displayed on the display unit 73 of the remote control device 60, it is possible to confirm whether imaging action is performed in a state in which the noticed imaging target is in focus.

2-1-4. Difference Example of Action of First Embodiment

Next, as another example of an action of the first embodiment, an operation in a case where not only the noticed imaging target but also the position of the user move is described.

Figure 7:
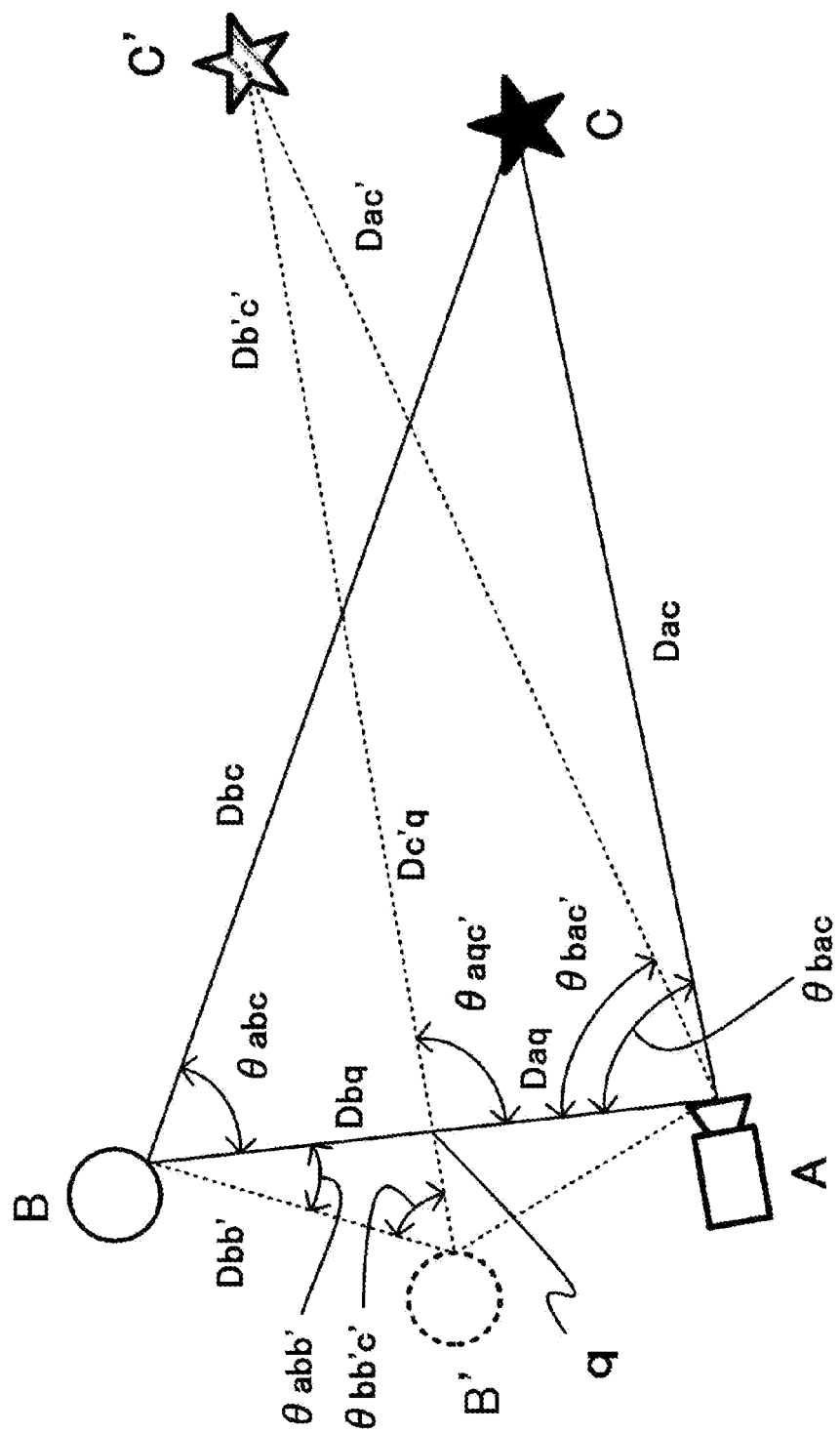
FIG. 7 is a view illustrating another action of the imaging target position calculation unit.

FIG. 7 is a view illustrating another action of the imaging target position calculation unit of the imaging controlling unit. It is to be noted that, in FIG. 7, the position of the imaging device 20 attached to the pan head 40 is indicated by "A," the position of the remote control device 60 is indicated by "B," the position of the noticed imaging target is indicated by "C," a position of the remote control device 60 after movement is indicated by "B'," and a position of the noticed imaging target after movement is indicated by "C'." Further, a crossing point between a straight line interconnecting the position A and the position B and another straight line interconnecting a position B' and a position C' is indicated by "q."

In the imaging system 10, the imaging device 20 and the remote control device 60 are opposed to each other, and calibration is performed. The postures of the imaging device 20 and the remote control device 60 at this time are each determined as an initial state. Further, the remote control device 60 measures and transmits, to the imaging device 20, the distance Dab to the imaging device 20 in the initial state.

Thereafter, the user who wears the remote control device 60 turns to the direction of the noticed imaging target from the imaging device 20, and the distance measurement unit 711 of the remote control device 60 measures the distance Dbc from the position B to the position C. Further, the motion sensor unit 712 measures the angle θabc of the direction of the position C with respect to the reference direction (direction of the position A). The remote control device transmits, to the imaging device 20, the distance Dbc and the angle θabc as imaging target position information.

The imaging target position calculation unit 311 of the imaging device 20 calculates the distance Dac from the position A of the imaging device to the position C of the imaging target, on the basis of the expression (1).

In a case where the user who wears the remote control device 60 moves from the position B to the position B', the motion sensor unit 712 of the remote control device 60 measures a distance Dbb' from the position B to the position B' and an angle θaqc'. Further, the distance measurement unit 711 of the remote control device 60 measures a distance Db'c' from the position B' to the position C' of the imaging target after movement. The remote control device 60 transmits, to the imaging device 20, measurement results of the distance Dbb', the distance Db'c', and the angle θaqc' as imaging target position information.

The imaging target position calculation unit 311 of the imaging device 20 calculates a distance Db'a on the basis of the distance Dab and the distance Dbb'. Further, the imaging target position calculation unit 311 calculates an angle θabb' of the direction of the position B' after movement with respect to the reference direction (direction of the position A) when the remote control device 60 is at the position B, on the basis of an expression (3).

[Math. 3]

$$\cos\theta_{abb'} = \frac{D_{ab}^2 + D_{bb'}^2 - D_{ab'}^2}{2*D_{ab}*D_{bb'}} \quad (3)$$

Further, the imaging target position calculation unit 311 calculates a distance Dbq from the reference direction in the imaging device 20 (direction of the position B) to the crossing point q, on the basis of an expression (4). It is to be noted that an angle θab'c' is calculated on the basis of the angle θabB' and the angle θaqc'.

[Math. 4]

$$D_{bq} = \sqrt{D_{bb'}^2 + D_{b'q}^2 - 2*D_{bb'}*D_{b'q}*\cos\theta_{bb'q}} \quad (4)$$

The imaging target position calculation unit 311 subtracts the distance Dbq from the distance Dab to calculate the distance Dqa. Further, the imaging target position calculation unit 311 calculates a distance Db'q, for example, on the basis of the distance Dbb' and the angles θabb' and θbb'q and subtracts the calculated distance Db'q from the distance Db'c' to calculate the distance Dc'q. Furthermore, the imaging target position calculation unit 311 calculates a distance Dac', on the basis of an expression (5).

[Math. 5]

$$D_{ac'} = \sqrt{D_{c'q}^2 + D_{qa}^2 - 2*D_{c'q}*D_{qa}*\cos\theta_{aqc'}} \quad (5)$$

Further, the imaging target position calculation unit 311 calculates an angle θbac' of the direction of the position C' with respect to the reference direction in the imaging device 20 (direction of the position B), on the basis of an expression (6).

[Math. 6]

$$\cos\theta_{bac'} = \frac{D_{aq}^2 + D_{ac'}^2 - D_{c'q}^2}{2*D_{aq}*D_{ac'}} \quad (6)$$

The imaging target position calculation unit 311 outputs the calculated angle θbac' to the imaging direction controlling unit 312, and the imaging direction controlling unit 312 generates a direction controlling signal for setting the imaging direction of the imaging device 20 to the direction of the angle θbac' with respect to the reference direction (direction of the position B) and outputs the direction controlling signal to the pan head 40. Accordingly, the imaging direction of the imaging device 20 can be made the direction of the noticed imaging target after movement.

Further, the imaging target position calculation unit 311 outputs the calculated distance Dac' to the focus controlling unit 313, and the focus controlling unit 313 generates a focus controlling signal for setting the focus position of the imaging device 20 to the distance Dac' and outputs the focus controlling signal to the imaging optical system block 21. Accordingly, the focus of the imaging device 20 can be adjusted to the noticed imaging target after movement.

Further, if the user changes his/her posture and position so as to track the noticed imaging target, then the remote control device 60 generates new imaging target position information indicative of the distance to the noticed imaging target and movement information for tracking the noticed imaging target and transmits the new imaging target position information to the imaging device 20. Accordingly, by performing imaging direction control and focus control on the basis of the new imaging target position information, even if the user moves, the imaging device 20 can cause the imaging direction and the focus position to track the noticed imaging target so as to be able to successively acquire captured images in which the noticed imaging target is in focus.

Furthermore, since the captured image acquired by the imaging device 20 is displayed on the display unit 73 of the remote control device 60, it can be confirmed whether an imaging action is performed in a state in which the noticed imaging target is in focus.

2-2. Second Embodiment

Although the first embodiment described hereinabove is directed to a case in which the position of the imaging device 20 is fixed, the imaging device 20 may be movable. Next, as a second embodiment, a case in which the imaging device is movable is described.

Figure 8:
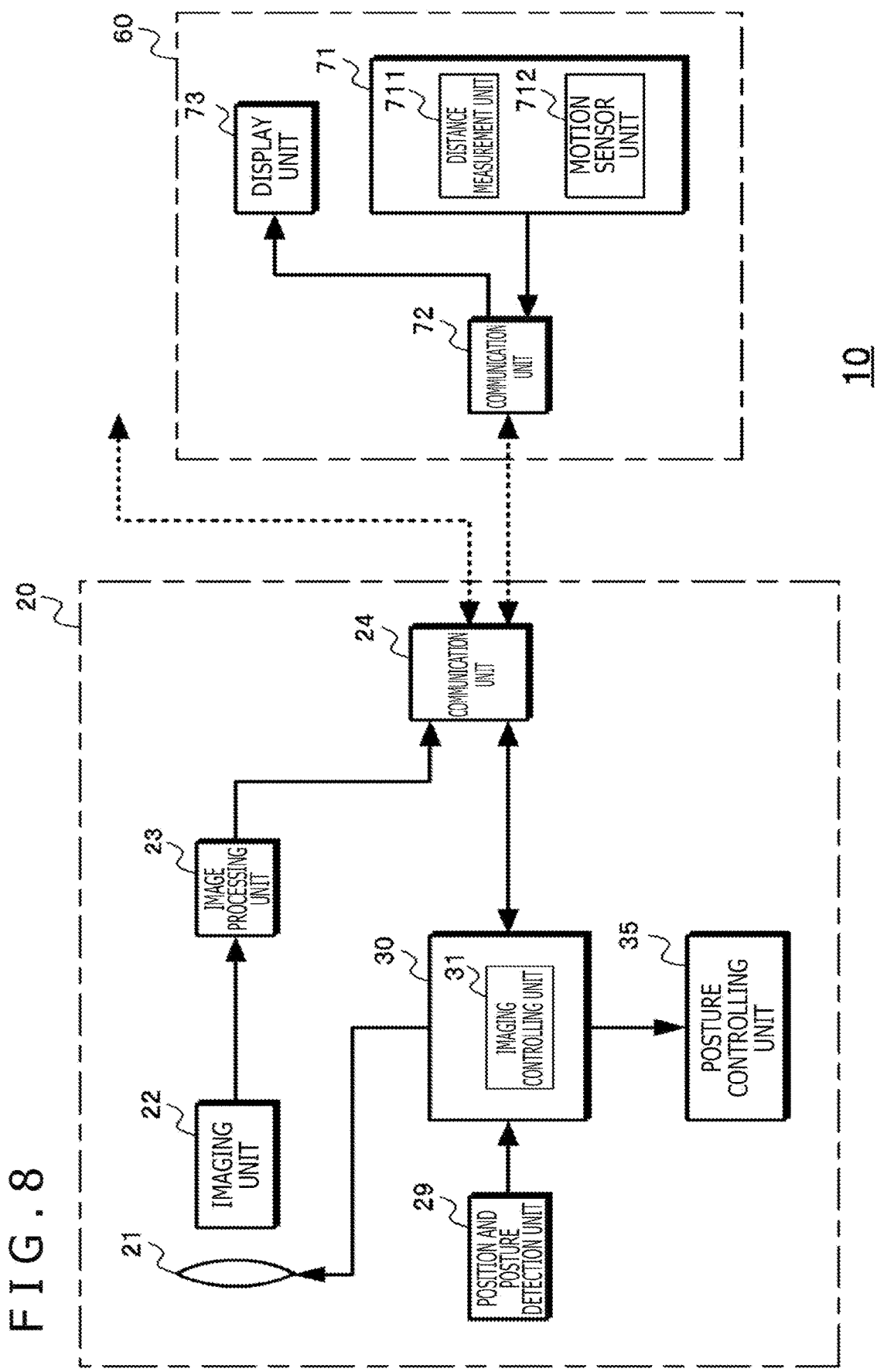
FIG. 8 is a view exemplifying a configuration of a second embodiment.

FIG. 8 exemplifies a configuration of the second embodiment. The imaging device 20 includes the imaging optical system block 21, the imaging unit 22, the image processing unit 23, the communication unit 24, the position and posture detection unit 29, the control unit 30, and a posture controlling unit 35. The imaging device 20 may further include the display unit 25, the recording unit 26, and the outputting unit 27.

The imaging optical system block 21 is configured using a focusing lens and forms an imaging target optical image on an imaging plane of the imaging unit 22. Further, the imaging optical system block 21 may include a zoom lens, an iris mechanism, and so forth.

The imaging unit 22 includes an imaging element, such as a CMOS (Complementary Metal Oxide Semiconductor) or a CCD (Charge Coupled Device), and a signal processing unit. The imaging element performs photoelectric conversion to generate an image signal according to an imaging target optical image. The signal processing unit performs a denoising process, a gain adjustment process, an analog/digital conversion process, defective pixel correction, a development process, and so forth on a pixel signal generated by the imaging element. The imaging unit outputs the generated image signal to the image processing unit 23. Further, the imaging unit 22 outputs the generated image signal to the recording unit 26 and the outputting unit 27.

The image processing unit 23 converts an image signal supplied from the imaging unit 22 into an image signal according to a display resolution of the display unit 73 of the remote control device 60 and outputs the image signal after the conversion to the communication unit 24. Further, the image processing unit 23 converts an image signal supplied from the imaging unit 22 into an image signal according to the display resolution of the display unit 25 and outputs the image signal to the display unit 25.

The communication unit 24 performs communication with the remote control device 60 and transmits an image signal supplied from the image processing unit 23 to the remote control device 60. Further, the remote control device 60 receives imaging target position information transmitted from the remote control device 60 and outputs the imaging target position information to the control unit 30. Furthermore, the communication unit 24 communicates with an external device and transmits an image signal supplied from the image processing unit 23 to the external device.

The display unit 25 is configured using a liquid crystal display element, an organic EL display element, or the like. The display unit 25 displays a captured image generated by the imaging device 20, on the basis of an image signal supplied from the image processing unit 23. Further, the display unit 25 performs menu display or the like of the imaging device 20 on the basis of a control signal from the control unit 30.

The recording unit 26 is configured using a recording medium fixed to the imaging device 20 or a recording medium removable from the imaging device 20. The recording unit 26 records an image signal generated by the imaging unit 22 into a recording medium, on the basis of a control signal from the control unit 30. Further, the outputting unit 27 outputs an image signal generated by the imaging unit 22 to an external device, on the basis of a control signal from the control unit 30.

The position and posture detection unit 29 includes a position measurement signal processing unit that receives, for example, positioning signals transmitted from positioning satellites or the like to measure the position and a motion sensor unit such as a nine-axis sensor and so forth. The position and posture detection unit 29 detects the position, the posture, a position movement amount, a posture change amount, and so forth of the imaging device 20 and outputs position and posture detection results to the control unit 30.

The control unit 30 includes a CPU (Central Processing Unit), a ROM (Read Only Memory), a RAM (Random Access Memory), and so forth. The ROM has stored therein various programs that are executed by the CPU. The RAM stores information such as various parameters therein. The CPU executes the various programs stored in the ROM to control each unit such that an action according to a user operation is performed by the imaging device 20. Further, the control unit 30 includes the imaging controlling unit 31 that controls the imaging device 20 to capture an image of the noticed imaging target OB on the basis of imaging target position information supplied from the remote control device 60.

The imaging controlling unit 31 includes the imaging target position calculation unit 311, the imaging direction controlling unit 312, and the focus controlling unit 313, as described hereinabove with reference to FIG. 4.

The imaging target position calculation unit 311 calculates the direction of the noticed imaging target and the distance to the noticed imaging target, on the basis of position and posture detection results supplied from the position and posture detection unit 29 and imaging target position information supplied from the remote control device 60. The imaging target position calculation unit 311 outputs, to the imaging direction controlling unit 312, a calculation result of the direction of the noticed imaging target and outputs, to the focus controlling unit 313, a calculation result of the distance to the noticed imaging target.

The imaging direction controlling unit 312 generates, on the basis of the calculation result of the direction of the noticed imaging target, a direction controlling signal such that the imaging direction of the imaging device 20 becomes the direction of the noticed imaging target, and outputs the direction controlling signal to the posture controlling unit 35. Further, the focus controlling unit 313 generates, on the basis of a calculation result of the distance to the noticed imaging target, a focus controlling signal such that the focus position of the imaging device 20 becomes the noticed imaging target, and outputs the focus controlling signal to the imaging optical system block 21.

The posture controlling unit 35 controls, on the basis of the direction controlling signal from the imaging controlling unit 31, the posture of a moving body on which the imaging device 20 is mounted such that the imaging direction of the imaging device 20 becomes the direction of the noticed imaging target. For example, in a case in which a moving body 45 is an unmanned flying object such as a drone, the posture controlling unit 35 controls the flying posture of the unmanned flying object such that the imaging direction of the imaging device 20 mounted on the unmanned flying object becomes the direction of the noticed imaging target.

The remote control device 60 is described. The remote control device 60 includes the imaging target position information generation unit 71, the communication unit 72, and the display unit 73. Further, the imaging target position information generation unit 71 includes the distance measurement unit 711 and the motion sensor unit 712.

The distance measurement unit 711 measures the distance to the noticed imaging target positioned directly in front of the user who wears the remote control device 60. The motion sensor unit 712 generates movement information indicative of amounts of change and so forth of a position change and a posture change of the remote control device 60. The imaging target position information generation unit 71 generates imaging target position information indicative of the distance to the noticed imaging target measured by the distance measurement unit 711 and the movement information generated by the motion sensor unit 712 and outputs the imaging target position information to the communication unit 72.

The communication unit 72 transmits the imaging target position information generated by the imaging target position information generation unit 71 to the imaging device 20. Further, the communication unit 72 receives an image signal transmitted from the imaging device 20 and outputs the image signal to the display unit 73.

The display unit 73 is configured using a liquid crystal display element, an organic EL display element, or the like. The display unit 73 displays a captured image generated by the imaging device 20, on the basis of an image signal received by the communication unit 72.

In such a second embodiment as described above, processing, for example, similar to that of the other example of the action of the first embodiment described hereinabove is performed to calculate the angle indicative of the direction of the noticed imaging target and the distance to the noticed imaging target with reference to the direction when the imaging device is in its initial state. Further, the angle of the direction of the noticed imaging target and the distance to the noticed imaging target are corrected according to the direction of movement and the amount of movement of the imaging device 20 from those in the initial state, the direction of movement and the amount of movement being detected by the position and posture detection unit 29, to calculate the direction of the noticed imaging target and the distance to the noticed imaging target.

Figure 9:
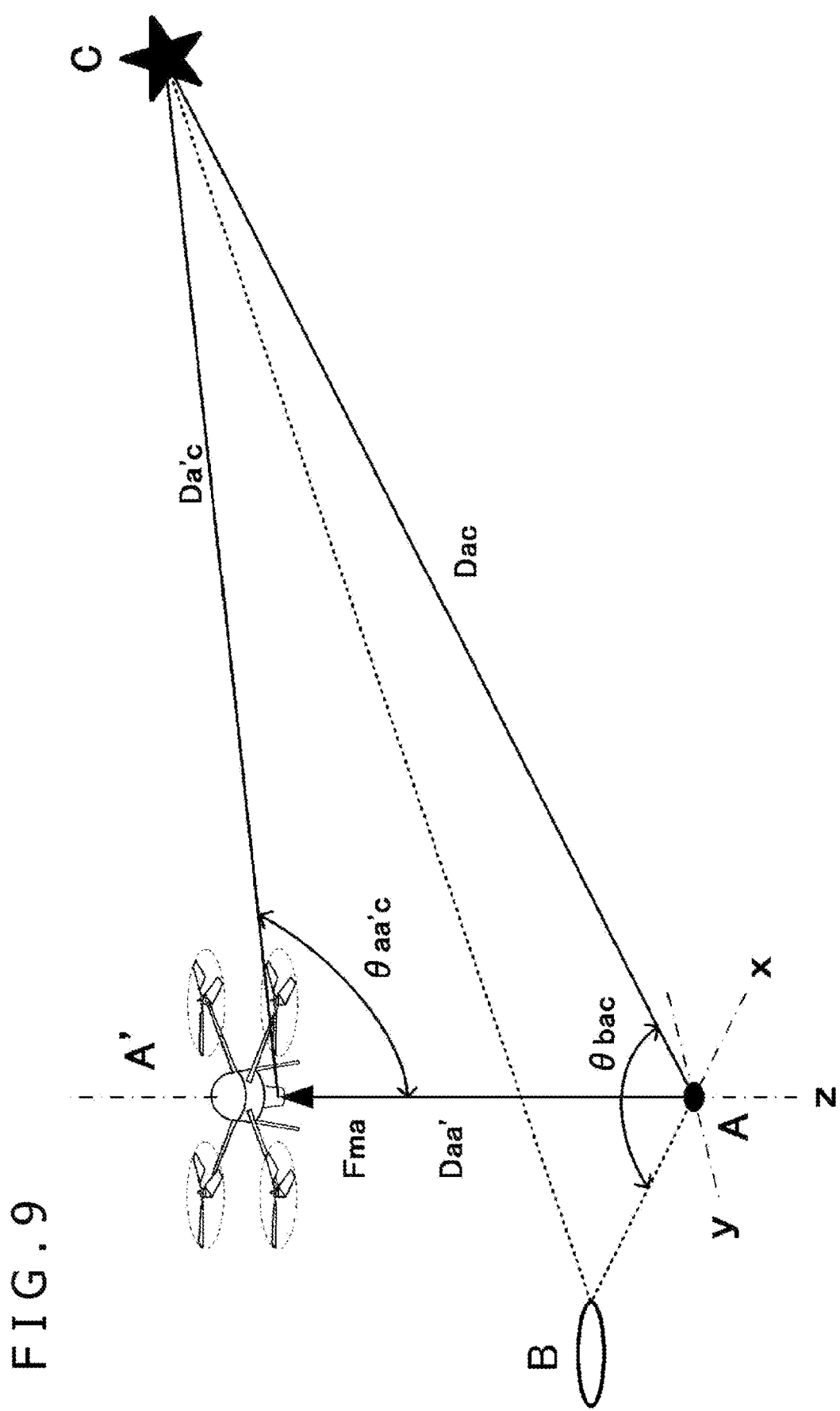
FIG. 9 is a view illustrating an action of the second embodiment.

Next, an action of the second embodiment is described with reference to FIG. 9. It is to be noted that, in FIG. 9, a position of the imaging device 20 attached to the unmanned flying object is indicated by "A," a position of the remote control device 60 is indicated by "B," and a position of the noticed imaging target is indicated by "C." Further, a position of the imaging device 20 is indicated as "A'." Further, it is assumed that a position A is determined as the origin of an xyz coordinate system, and a position B and a position C are on the xy plane and the positions A and B are positions on the x coordinate axis.

By performing a process similar to that of the first embodiment, the imaging controlling unit 31 can calculate the angle θbac indicative of the direction of the noticed imaging target and the distance Dac to the noticed imaging target when the imaging device 20 is at the position A. Meanwhile, the position and posture detection unit 29 can detect a distance Daa' from the position A to a position A' and a direction Fma of the position A' with respect to the position A. Accordingly, for the angle θbac and the distance Dac to the noticed imaging target, a correction process is performed on the basis of the distance Daa' and the direction Fma. For example, in a case where the imaging device 20 moves in the z direction, the direction of the noticed imaging target becomes a direction indicated by the angle θbac with reference to the x axis direction and an angle θaa'c with reference to the z axis direction. Further, it is sufficient if a distance Da'c is calculated on the basis of the distance Dac and the distance Daa'. It is to be noted that the angle θaa'c can be calculated on the basis of the distances Da'c, Dac, and Daa'. Further, in a case where the position A' moves not only in the z direction but also in the x direction or the y direction, if correction of the angle with reference to the x axis and calculation of the angle with reference to the z axis are performed on the basis of the angle θbac indicative of the direction of the noticed imaging target, distance Daa', and direction Fma, then the imaging direction of the imaging device after the movement can be made the direction of the noticed imaging target.

In such a manner, according to the second embodiment, even in a case in which the imaging device 20 moves in a three-dimensional direction, the noticed imaging target indicated by the remote control device 60 can be imaged by the imaging device 20 provided on the moving body. Further, even if the moving body or the remote control device moves, the imaging device 20 can continue imaging of the noticed imaging target.

2-3. Other Embodiments

Although the embodiments described above exemplify a case in which the imaging controlling unit is provided on the imaging device, the imaging controlling unit 31 may be provided on the remote control device 60. For example, in a case where the position of the imaging device 20 is fixed as in the first embodiment, even if detection results of the position and the posture are not acquired from the imaging device 20, by performing such arithmetic operation processes as described above, the direction of the noticed imaging target and the distance to the noticed imaging target from the imaging device 20 can be calculated. Accordingly, a direction controlling signal and a focus controlling signal may be generated by the remote control device 60 and outputted to the imaging device 20. Further, the direction controlling signal may be outputted from the remote control device 60 to the pan head 40.

Further, some of functions of the imaging controlling unit 31, for example, the imaging target position calculation unit 311, may be provided on the remote control device 60 such that imaging target position calculation results indicative of the direction of the noticed imaging target and the distance to the noticed imaging target from the imaging device 20 are transmitted from the remote control device 60 to the imaging device 20.

Further, the configuration of the remote control device 60 is not limited to the configuration of mounting the remote control device 60 on the head of the user as in the embodiments described hereinabove. For example, the remote control device may be configured so as to have a bar-like shape, a cylindrical shape, a prism shape, or the like and generates imaging target position information with a direction of a distal end portion thereof set to the noticed imaging target direction.

3. APPLICATION EXAMPLE

The technology according to the present disclosure can be applied to various products. For example, the technology according to the present disclosure may be applied to a surgical operation system, a monitoring system, and so forth.

For example, the remote control device depicted in FIGS. 2A and 2B are worn by a surgical operator (doctor) while the imaging device is arranged so as to be able to capture an image of a surgical site. Further, the pan head is configured so as to allow the imaging direction of the imaging device to move at least within a surgical operation range. If the remote control device, the imaging device, and the pan head are provided in such a manner, then the diseased part region of which the surgical operator takes notice can be imaged while the diseased part region is tracked by the imaging device.

Further, the remote control device depicted in FIGS. 2A and 2B are worn by a monitoring person while the imaging device is arranged so as to be able to image a monitoring target region. Further, the pan head is configured so as to be able to move the imaging direction of the imaging device at least within a monitoring target range. If the remote control device, the imaging device, and the pan head are provided in this manner, then the monitoring person can image a monitoring target person noticed by the monitoring person while tracking the monitoring target person with the imaging device.

It is possible to execute the series of processes described in the specification by hardware, by software, or by a composite configuration of them. In a case where the series of processes is executed by software, a program in which the processing sequence is recorded is installed into a memory in a computer and is executed by the computer incorporated in hardware for exclusive use. Alternatively, the program can be installed into and executed by a computer for universal use that can execute various processes.

For example, it is possible to record in advance the program on or in a hard disk, an SSD (Solid State Drive), or a ROM (Read Only Memory) as a recording medium. Alternatively, it is possible to store (record) in advance the program temporarily or permanently on a removable recording medium such as a flexible disk, a CD-ROM (Compact Disc Read Only Memory), an MO (Magneto optical) disk, a DVD (Digital Versatile Disc), a BD (Blu-Ray Disc (registered trademark)), a magnetic disk, or a semiconductor memory card. Such a removable recording medium as just described can be provided as what is called packet software.

Further, the program may not only be installed from a removable recording medium into a computer but may also be transferred from a download site to a computer by wireless or wired transfer through a network such as a LAN (Local Area Network) or the Internet. The computer can receive the program transferred thereto in such a manner and install the program into a recording medium such as a built-in hard disk.

It is to be noted that the advantageous effects described in the present specification are exemplary to the last and are not restrictive, and additional advantageous effects that are not described herein may be available. Further, the present technology shall not be interpreted restrictive to the embodiments of the technology described hereinabove. The embodiments of the present technology disclose the present technology in the form of illustration, and it is self-evident that modification and substitution of the embodiments can be performed by those skilled in the art without departing from the subject matter of the present technology. In other words, in order to determine the subject matter of the present technology, claims should be referred to.

Further, also it is possible for the remote control device of the present technology to take such configurations as described below.

(1)

A remote control device including:

a distance measurement unit that measures a distance to an imaging target;

a motion sensor unit that measures a movement from an initial state; and a communication unit that transmits imaging target position information indicative of the distance measured by the distance measurement unit and the movement measured by the motion sensor unit to a control target device.

(2)
The remote control device according to (1), in which the initial state is a state in which the distance measurement unit and an imaging unit of the control target device are opposed to each other, and the distance to the imaging unit measured by the distance measurement unit and a direction of the imaging unit are used as references.

(3)
The remote control device according to (1) or (2), further including:
a display unit, in which
the communication unit receives a captured image generated by the imaging unit of the control target device, and
the display unit displays the captured image received by the communication unit.

(4)
The remote control device according to (3), further including:
a hold unit that holds the display unit and the distance measurement unit such that the display unit is at a position of eyes of a user and the distance measurement unit is at a position from which the distance measurement unit measures a distance to the imaging target that is positioned directly in front of the user.

Further, also it is possible for the imaging controlling device of the present technology to take such configurations as described below.

(1)
An imaging controlling device including:
an imaging target position calculation unit that calculates, on the basis of imaging target position information indicative of a distance from a remote control device to an imaging target and a movement of the remote control device from an initial state, a direction of the imaging target with respect to a direction in the initial state of an imaging unit of a control target device.

(2)
The imaging controlling device according to (1), in which the initial state is a state in which a distance measurement unit of the remote control device and the imaging unit of the control target device are opposed to each other, and a direction of the distance measurement unit is used as a reference for the control target device.

(3)
The imaging controlling device according to (1) or (2), in which the imaging target position calculation unit is provided on the remote control device or the control target device.

(4)
The imaging controlling device according to any one of (1) to (3), further including:
an imaging direction controlling unit that generates a direction controlling signal for setting an imaging direction of the imaging unit of the control target device to the direction of the imaging target calculated by the imaging target position calculation unit.

(5)
The imaging controlling device according to (4), in which the imaging direction controlling unit is provided on the remote control device or the control target device.

(6)
The imaging controlling device according to any one of (1) to (5), in which the imaging target position calculation unit calculates a distance from the imaging unit to the imaging target.

(7)
The imaging controlling device according to (6), further including:
a focus controlling unit that generates a focus controlling signal for setting a focus position of the imaging unit of the control target device to a position of the distance to the imaging target calculated by the imaging target position calculation unit.

(8)
The imaging controlling device according to (7), in which the focus controlling unit is provided on the remote control device or the control target device.

REFERENCE SIGNS LIST

10: Imaging system
20: Imaging device
21: Imaging optical system block
22: Imaging unit
23: Image processing unit
24: Communication unit
25: Display unit
26: Recording unit
27: Outputting unit
28: Posture detection unit
29: Position and posture detection unit
30: Control unit
31: Imaging controlling unit
35: Posture controlling unit
40: Pan head
45: Moving body
60: Remote control device
61: Hold unit
62: Arm unit
63: Ocular block
64: Circuit block
65: Power supply unit
71: Imaging target position information generation unit
72: Communication unit
73: Display unit
311: Imaging target position calculation unit
312: Imaging direction controlling unit
313: Focus controlling unit
610: Neck band
611L, 611R: Ear pad
711: Distance measurement unit
712: Motion sensor unit

The invention claimed is:
1. A remote control device, comprising:
a distance measurement unit configured to measure a distance to an imaging target; and
a sensor configured to measure a movement from an initial state, wherein
the initial state is a state in which the distance measurement unit is opposite to an imaging unit of a control target device, and
the distance to the imaging target measured by the distance measurement unit and a direction of the imaging unit are used as references; and
a central processing unit (CPU) configured to transmit imaging target position information indicative of the distance measured by the distance measurement unit and the movement measured by the sensor to the control target device.

2. The remote control device according to claim 1, further comprising:
a display element, wherein
the CPU is further configured to receive a captured image generated by the imaging unit of the control target device, and
the display element is configured to display the captured image.

3. The remote control device according to claim 2, further comprising:
a hold unit configured to hold the display element and the distance measurement unit such that the display element is at a position of eyes of a user and the distance measurement unit is at a position from which the distance measurement unit measures the distance to the imaging target that is positioned directly in front of the user.

4. A remote control method, comprising:
measuring, by a distance measurement unit, a distance to an imaging target;
measuring, by a sensor, a movement from an initial state, wherein
the initial state is a state in which the distance measurement unit is opposite to an imaging unit of a control target device, and
the distance to the imaging target measured by the distance measurement unit and a direction of the imaging unit are used as references; and
transmitting, by a central processing unit (CPU), imaging target position information indicative of the distance measured by the distance measurement unit and the movement measured by the sensor to the control target device.

5. An imaging controlling device, comprising:
an imaging target position calculation unit configured to calculate, based on imaging target position information indicative of a distance from a remote control device to an imaging target and a movement of the remote control device from an initial state, a direction of the imaging target with respect to a direction in the initial state of an imaging unit of a control target device, wherein
the initial state is a state in which a distance measurement unit of the remote control device is opposite to the imaging unit of the control target device, and
a direction of the distance measurement unit is used as a reference for the control target device.

6. The imaging controlling device according to claim 5, wherein the imaging target position calculation unit is on the remote control device or the control target device.

7. The imaging controlling device according to claim 5, further comprising:
an imaging direction controlling unit configured to generate a direction controlling signal to set an imaging direction of the imaging unit of the control target device to the direction of the imaging target calculated by the imaging target position calculation unit.

8. The imaging controlling device according to claim 7, wherein the imaging direction controlling unit is on the remote control device or the control target device.

9. The imaging controlling device according to claim 5, wherein the imaging target position calculation unit is further configured to calculate a distance from the imaging unit to the imaging target.

10. The imaging controlling device according to claim 9, further comprising:
a focus controlling unit configured to generate a focus controlling signal to set a focus position of the imaging unit of the control target device to a position of the distance to the imaging target calculated by the imaging target position calculation unit.

11. The imaging controlling device according to claim 10, wherein the focus controlling unit is on the remote control device or the control target device.

12. An imaging controlling method, comprising:
calculating, by an imaging target position calculation unit, based on imaging target position information indicative of a distance from a remote control device to an imaging target and a movement of the remote control device from an initial state, a direction of the imaging target with respect to the initial state of an imaging unit of a control target device, wherein
the initial state is a state in which a distance measurement unit of the remote control device is opposite to the imaging unit of the control target device, and
a direction of the distance measurement unit is used as a reference for the control target device.

* * * * *